US008447665B1

(12) United States Patent
Schoenharl et al.

(10) Patent No.: US 8,447,665 B1
(45) Date of Patent: May 21, 2013

(54) REMOVAL OF EXPIRING ITEMS FROM INVENTORY

(75) Inventors: Timothy W. Schoenharl, Bellevue, WA (US); Chun-Ning Poon, Seattle, WA (US); Andrew T. Bass, Auburn, WA (US); Youjiang Wu, Seattle, WA (US); Bhagyalaxmi Bethala, Bellevue, WA (US); Bhaskar Maddala, Seattle, WA (US); Dongui Zhuo, Seattle, WA (US); Oley Y. Palyvoda, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 33 days.

(21) Appl. No.: 13/076,215

(22) Filed: Mar. 30, 2011

(51) Int. Cl.
*G06Q 10/00* (2012.01)

(52) U.S. Cl.
USPC ............... 705/28; 705/22; 705/35; 235/383; 235/379; 235/385

(58) Field of Classification Search
USPC .............. 705/28, 22; 235/383, 375, 379, 385
See application file for complete search history.

(56) References Cited

U.S. PATENT DOCUMENTS

| | | | |
|---|---|---|---|
| 5,237,496 A | 8/1993 | Kagami et al. |
| 5,570,291 A | 10/1996 | Dudle et al. |
| 5,608,621 A | 3/1997 | Caveney et al. |
| 5,615,109 A | 3/1997 | Eder |
| 5,870,733 A | 2/1999 | Bass et al. |
| 5,953,707 A | 9/1999 | Huang et al. |
| 6,032,125 A | 2/2000 | Ando |
| 6,044,356 A | 3/2000 | Murthy et al. |
| 6,049,742 A | 4/2000 | Milne et al. |
| 6,151,582 A | 11/2000 | Huang et al. |
| 6,154,728 A | 11/2000 | Sattar et al. |
| 6,298,333 B1 | 10/2001 | Manzi et al. |
| 6,366,890 B1 | 4/2002 | Usrey |
| 6,397,226 B1 | 5/2002 | Sage |
| 6,609,101 B1 | 8/2003 | Landvater |
| 6,631,413 B1 | 10/2003 | Aggarwal et al. |
| 6,671,673 B1 | 12/2003 | Baseman et al. |
| 6,754,637 B1 | 6/2004 | Stenz |
| 6,757,689 B2 | 6/2004 | Battas et al. |
| 6,826,538 B1 | 11/2004 | Kalyan et al. |

(Continued)

OTHER PUBLICATIONS

U.S. Appl. No. 13/004,621, filed Jan. 11, 2011, Graig J. Pape, et al.

(Continued)

*Primary Examiner* — Vanel Frenel
(74) *Attorney, Agent, or Firm* — Robert C. Kowert; Meyertons, Hood, Kivlin, Kowert & Goetzel, P.C.

(57) ABSTRACT

Systems and methods for the removal of expiring items from inventory are disclosed. In some embodiments, a method includes determining a breakeven holding time for an inventory item and calculating, based at least in part on a demand forecast for the inventory item and on the breakeven holding time, a first quantity of the inventory item to be removed from the inventory. The method also includes identifying an expiration time corresponding to the given inventory item and, in response to the expiration time being shorter than the breakeven holding time, calculating a second quantity of the inventory item, where a difference between the second and first quantities represents an additional quantity of the inventory item to be removed from the inventory. The method further includes causing at least one portion of the additional quantity of the inventory item to be removed from the inventory according to an inventory removal function.

20 Claims, 6 Drawing Sheets

U.S. PATENT DOCUMENTS

| | | | |
|---|---|---|---|
| 6,836,773 | B2 | 12/2004 | Tamayo et al. |
| 6,845,909 | B2 | 1/2005 | Bong et al. |
| 6,847,934 | B1 | 1/2005 | Lin et al. |
| 6,868,397 | B1 | 3/2005 | McCaslin |
| 6,910,017 | B1 | 6/2005 | Woo et al. |
| 6,931,347 | B2 | 8/2005 | Boedi et al. |
| 6,963,847 | B1 | 11/2005 | Kennedy et al. |
| 7,069,234 | B1 | 6/2006 | Cornelius et al. |
| 7,092,929 | B1 | 8/2006 | Dvorak et al. |
| 7,124,941 | B1 | 10/2006 | O'Connell |
| 7,133,848 | B2 | 11/2006 | Phillips et al. |
| 7,146,327 | B1 | 12/2006 | Howard et al. |
| 7,212,976 | B2 | 5/2007 | Scheer |
| 7,228,287 | B1 | 6/2007 | Samson et al. |
| 7,231,354 | B1 | 6/2007 | Rooks et al. |
| 7,251,611 | B2 | 7/2007 | Abbott et al. |
| 7,433,834 | B2 | 10/2008 | Joao |
| 7,542,883 | B2 | 6/2009 | Kumazawa et al. |
| 7,543,743 | B1 | 6/2009 | Yu et al. |
| 7,607,577 | B1 | 10/2009 | Yu et al. |
| 7,881,986 | B1 * | 2/2011 | Pape et al. ............ 705/28 |
| 7,912,754 | B2 | 3/2011 | Trinato et al. |
| 2002/0069079 | A1 | 6/2002 | Vega |
| 2002/0072999 | A1 | 6/2002 | Andres et al. |
| 2002/0099631 | A1 | 7/2002 | Vanker et al. |
| 2002/0116348 | A1 | 8/2002 | Phillips et al. |
| 2002/0128938 | A1 | 9/2002 | Schofield et al. |
| 2002/0143598 | A1 | 10/2002 | Scheer |
| 2002/0143669 | A1 | 10/2002 | Scheer |
| 2002/0147630 | A1 | 10/2002 | Rose et al. |
| 2002/0147666 | A1 | 10/2002 | Baseman et al. |
| 2002/0147767 | A1 | 10/2002 | Brice et al. |
| 2002/0156684 | A1 | 10/2002 | Stone et al. |
| 2002/0156884 | A1 | 10/2002 | Bertram et al. |
| 2002/0178071 | A1 * | 11/2002 | Walker et al. ............ 705/26 |
| 2003/0004750 | A1 | 1/2003 | Teraoka et al. |
| 2003/0009416 | A1 | 1/2003 | Mara |
| 2003/0028457 | A1 | 2/2003 | Costa et al. |
| 2003/0046156 | A1 | 3/2003 | Cromer et al. |
| 2003/0050817 | A1 | 3/2003 | Cargille et al. |
| 2003/0083936 | A1 | 5/2003 | Mueller et al. |
| 2003/0130966 | A1 | 7/2003 | Thompson et al. |
| 2003/0233246 | A1 | 12/2003 | Snapp et al. |
| 2004/0006504 | A1 | 1/2004 | Mariamova et al. |
| 2004/0059627 | A1 | 3/2004 | Baseman et al. |
| 2004/0068459 | A1 | 4/2004 | Goulet et al. |
| 2004/0078287 | A1 | 4/2004 | Yang |
| 2004/0128212 | A1 | 7/2004 | Zieger et al. |
| 2004/0199397 | A1 | 10/2004 | Dresden |
| 2004/0215544 | A1 | 10/2004 | Formale et al. |
| 2004/0249711 | A1 | 12/2004 | Walker et al. |
| 2004/0260626 | A1 | 12/2004 | Christie et al. |
| 2005/0055286 | A1 | 3/2005 | Zimet |
| 2005/0131779 | A1 | 6/2005 | Kitamura et al. |
| 2005/0154630 | A1 | 7/2005 | Lin et al. |
| 2006/0111989 | A1 | 5/2006 | Church et al. |
| 2006/0122881 | A1 | 6/2006 | Walker et al. |
| 2006/0161504 | A1 | 7/2006 | Walser et al. |
| 2007/0136126 | A1 | 6/2007 | Notani et al. |
| 2008/0177593 | A1 | 7/2008 | Clayton et al. |
| 2008/0301009 | A1 * | 12/2008 | Plaster et al. ............ 705/28 |
| 2009/0030761 | A1 | 1/2009 | Amaresh et al. |

OTHER PUBLICATIONS

Bringing the Factory to the Classroom, Cathleen Burns, Jan. 1, 1997, 5 pages.

The Correlative Relationship between value, price and Cost, Journal of American Academy of Business, Cambridge, MA Sep. 2002, 9 pages.

Why are returns to tough, Bob Trebilcock, Oct. 2001, Modern Materials v. 56, n11, p. 45.

U.S. Appl. No. 11/077,432, filed Mar. 10, 2005.

U.S. Appl. No. 11/076,844, filed Mar. 10, 2005.

U.S. Appl. No. 11/299,860, filed Dec. 12, 2005.

SellerEngine FAQ, Feb. 2005, downloaded from http://web.archive.org/web20050220024916/www.sellerengine.com/faq.htm, pp. 1-5.

SellerEngine general overview, Feb. 2005, downloaded from http://web.archive.org/web/20050222005850/http://www.sellerengine.com/SellerEngine.htm, pp. 1-3.

SellerEngine product overview, Feb. 2005, downloaded from http://web.archive.org/web/20050121013225/www.sellersengine.com/trialguide.htm, pp. 1-2.

Fillz FAQ, Feb. 2005, downloaded from http://web.archive.org/web/20050212084321/http://www.fillz.com/faq/cc_inventory, pp. 1-3.

Vendio Overview, Feb. 2005, downloaded from http://web.archive.or/web/20050208103009/http://www.vendio.com/my/smpp/feature_matrix.html, pp. 1-3.

ScoutPal Overview, Feb. 2005, downloaded from http://web.archive.org/web/20050210151425/http://www.scoutpal.com/, 1 page.

Nahmias, Steven (1979), "Simple Approximations for a Variety of Dynamic Leadtime Lost-Sales Inventory Models," Operations Research, vol. 27 (5), 904-924.

Vendio Feature Matrix, Feb. 2005, downloaded from http://web.archive.org/web/2005028103009/http://www.vendio.com/my/smpp/feature_matrix.html, pp. 13.

Schneider, Helmut (1981), "Effect of Service-Levels on Order-Points or Order-Levels in Inventory Models," International Journal in Production Research, vol. 19 (6), 615-631.

U.S. Appl. No. 12/428,982, filed Apr. 23, 2009.

* cited by examiner

REMOVAL OF EXPIRING ITEMS FROM INVENTORY

BACKGROUND

In order to offer customers a variety of items readily available for delivery, a merchant (whether engaging in electronic or conventional "brick and mortar" commerce) may hold various quantities of such items within one or more inventory facilities. Keeping items in inventory may serve to buffer variations in customer demand, or in a manufacturer or distributor's ability to supply various items. For example, different items offered for sale by the merchant may have different manufacturer lead times. Holding quantities of such items in inventory may enable the merchant to offer a more consistent availability of these items to customers despite the different lead times.

Many merchants employ inventory management schemes that attempt to ensure that the inventory on hand is sufficient to cover expected customer order volumes for a particular period of time. In other words, inventory management schemes typically focus only on whether there is enough inventory on hand to meet projected demand. However, storing inventory is not without complications. For example, providing and maintaining a physical facility in which to store inventory presents recurring infrastructure costs directly attributable to the inventory items stored in the facility. Further, while items are in storage awaiting sale, debt or capital costs associated with the items may accumulate. Items being held in inventory may also depreciate, become obsolete, expire or spoil (e.g., in the case of perishable items), become damaged, or otherwise incur other costs attributable to holding. As such, when these and other inventory holding costs are considered, having too much inventory may also become a concern.

Figure 1:
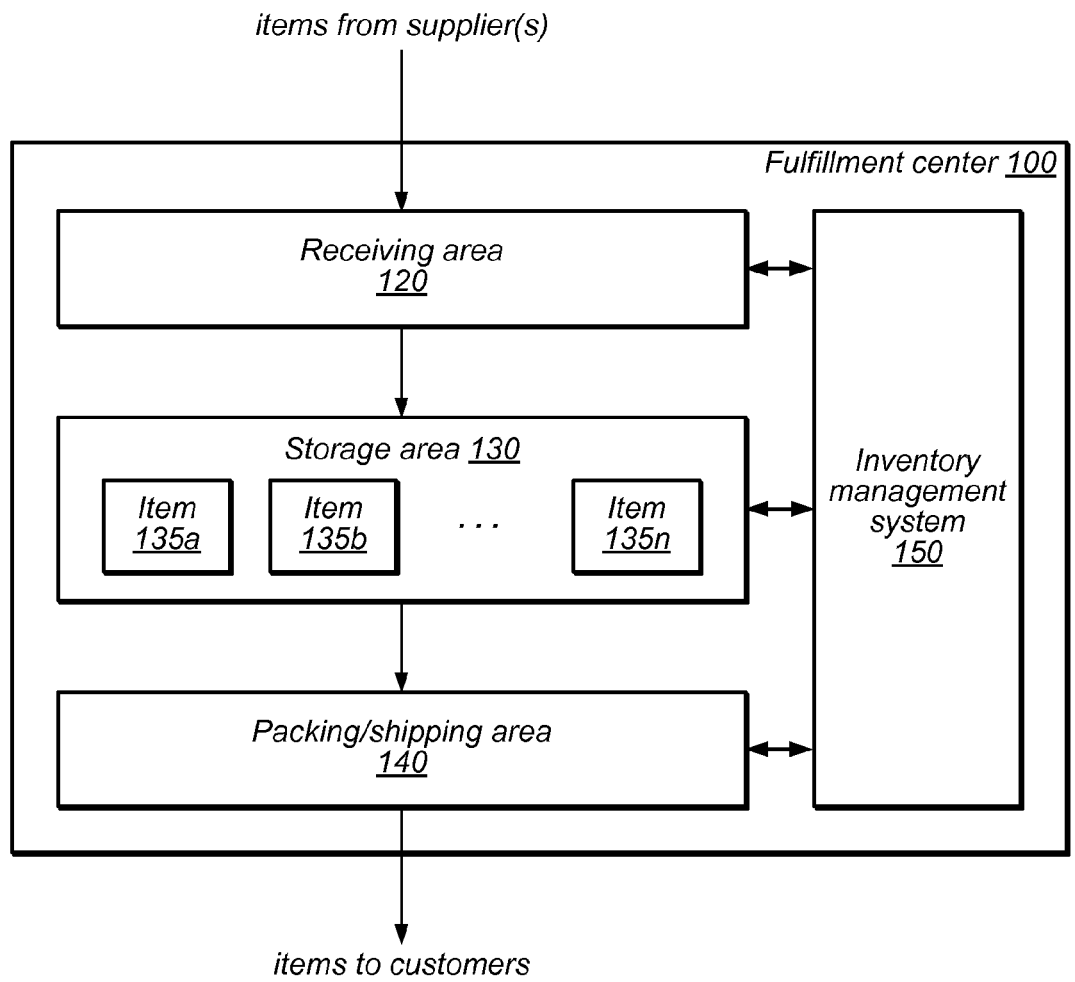
FIG. 1 is a block diagram illustrating a fulfillment center according to some embodiments.

While the specification is susceptible to various modifications and alternative forms, specific embodiments thereof are shown by way of example in the drawings and will herein be described in detail. It should be understood, however, that the drawings and detailed description thereto are not intended to limit the appended claims to the particular form disclosed, but on the contrary, the intention is to cover all modifications, equivalents and alternatives falling within the spirit and scope of the specification.

DETAILED DESCRIPTION OF EMBODIMENTS

Introduction

In the sections below, this specification describes inventory management systems, followed by a discussion of several concepts related to inventory health. The specification then discloses an inventory health software module, as well as various techniques that may be used for removing expiring items from inventory. Lastly, the specification describes a computer system suitable for implementing systems and methods described herein.

Inventory Management

One embodiment of a fulfillment center configured to store inventory items is illustrated in FIG. 1. In the illustrated embodiment, fulfillment center 100 includes a receiving area 120, a storage area 130 configured to store an arbitrary number of inventory items 135*a-n*, and a packing/shipping area 140. The arrangement of the various areas within the illustrated embodiment of fulfillment center 100 is depicted functionally rather than schematically. For example, in some embodiments, it is noted that multiple different receiving areas 120, storage areas 130 and packing/shipping areas 40 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of inventory items 135 from various suppliers and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 35, as appropriate.

After arriving through receiving area 120, items 135 may be stored within storage area 30. In some embodiments, like items 135 may be stored together in bins, on shelves or via other suitable storage mechanisms, such that all items 135 of a given kind are stored in one location. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for delivery to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

Management of items 135 stored as inventory within fulfillment center 1000 presents complex optimization problems. Generally speaking, the level of inventory of a given item 35 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 35 ordered by a customer is not in stock within fulfillment center 100, the customer may be forced to wait for delivery until that particular item 35 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

However, various costs are typically associated with holding items 135 in storage for any period of time. In some embodiments, holding a unit of an item 135 in storage within storage area 130 may incur incremental storage costs. For example, the cost of providing fulfillment center 1000 in which items 135 may be stored may include recurring real estate costs (e.g., lease costs, debt service, etc.), personnel costs, facilities costs (e.g., utilities, maintenance, etc.) and any other costs associated with fulfillment center 100. In an embodiment, such costs may be incrementally apportioned to a given unit of an item 135 according to an area or volume of storage space occupied by that unit. For example, storage costs may be applied to each unit of each item 135 at a rate of dollars per square/cubic foot of item volume per unit of storage time (day, week, month, etc.). In other embodiments, different cost allocation methods may be employed. For example, in an embodiment the costs of providing special storage or handling, such as refrigeration, controlled atmosphere, etc. may exclusively be allocated to those items 135 that require such measures, rather than averaging those costs across all items 135. Similarly, in an embodiment, storage may include temporary capacity (e.g., short-term leased space, seasonal overflow capacity, etc.) as well as permanent capacity (e.g., owned space, year-round capacity, etc.), each of which may have different cost characteristics. Correspondingly, in some such embodiments items 135 stored within a particular type of facility may exclusively incur costs of the particular type of facility according to their storage utilization (e.g., area, volume, etc.). Alternatively, storage costs may be allocated to items 135 based upon their value or sales volume as opposed to their size. In some embodiments, additional costs associated with obtaining a given item 135, such as transportation/handling costs charged by a supplier or incurred by eventual shipment to a customer, may be included within storage costs for that given item 135.

In addition to storage costs, in some embodiments, holding a unit of an item 135 in storage may result in capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Depending on the accounting scheme used to manage the costs of inventory, a cost of debt or other time-value-of-money cost (also referred to as an economic cost) may be associated with the price paid for a given unit of an item 135. For example, in an embodiment an effective annual interest rate of 6% may be applied to the price paid for a unit of inventory and may continue to accrue until that unit is sold or otherwise disposed of. In some embodiments, economic costs may be applied to storage costs in addition to the price paid for a unit of inventory. In certain cases, negative economic costs may also be associated with units of items 135. For example, a supplier may offer a rebate for an item 135 that effectively reduces its cost.

Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. In some embodiments, two or more of the costs described herein may be combined or added to make up an item's holding cost. In some cases, such holding costs may be expressed as a fixed dollar amount (e.g., $5.00). In other cases, holding costs may be expressed as a dollar amount over a period of time (e.g., $0.50/week).

In addition to the foregoing, at least some of items 135 may also depreciate, expire, spoil and/or become obsolete. For example, in some embodiments, one or more of items 135 may be consumable or perishable products (e.g., food, drink, medicine, chemicals, etc.) that have expiration dates or shelf lives. Generally, a product's shelf life is associated with its quality, whereas the product's expiration is related to its safety (e.g., safe to use or consume). Accordingly, after the shelf life of a product has passed, it may still be safe (i.e., it may not have actually expired yet) although its quality is no longer guaranteed. As a practical matter, for some types of products, shelf lives and expiration dates may be used interchangeably. In some cases, however, a determination that product's shelf life has been reached (or is about to be reached) may serve as an indication that the product should to be disposed as soon as possible (e.g., via a sale, liquidation, or some other alternative disposition channel), or at least at some time prior to its expiration date.

Typically, an item's expiration date or shelf life may be expressed in different forms. For example, typical ways of indicating such dates include "best before" or "best by," which ordinarily refer to the product's shelf life and are advisory in nature. Other known ways of indicating these types of dates is through use of the term "use by," which often refers to actual expiration. In the United States, the Food & Drug Administration as well as the Agriculture Department may periodically issue and revise regulations governing the use of various products expirations dates or the like. Moreover, certain product manufacturers may voluntarily add such information to its products' packages in the absence of such regulations.

In some embodiments, one or more of items 135 may be non-perishable products that may nonetheless be considered to have an "expiration date" or time. For example, an electronic product (e.g., a cellular phone, television, media player, computer, etc.) may be rendered obsolete in later stages of its lifecycle. In general, a product's lifecycle may be divided various stages, including, for example: introduction, growth, maturity, and saturation/decline. As such, in some cases a product may be seen as having expired upon the beginning of its declining stage. In other cases, however, any other point in the product's lifecycle may be arbitrarily chosen as its expiration date.

In certain embodiments, a non-perishable product may be said to expire upon the release of a new version or revision of the same product. For example, if a distributor expects that a subsequent version or revision of a given a product will be available on a particular date, the current of that product may be seen as expiring on that same date. Additionally or alternatively, a given version of a product may be considered as expiring a specified amount of time (e.g., a few days, a week, a month, etc.) before or after the release date of the newer version. Moreover, a particular product may be thought of as expiring upon the release of another, competing product.

In some embodiments, the expiration of a particular product may be represented as a particular point in time, such as a calendar date (e.g., Dec. 31, 2011) or a length of time (e.g., 3 months from the product's manufacturing or purchase order). In other embodiments, the expiration may be represented by a distribution function that may be indicative of reduced demand for that product before and/or after a particular date. When the expiration time is expressed as a distribution, any suitable form of statistical calculation (e.g., mean, median, etc.) may be applied to extract a date or time from the distribution.

Inventory Health

Generally speaking, holding a larger inventory of an item 135 may better enable an enterprise to absorb fluctuations in demand for that item. However, in some circumstances, the various holding costs may erode some of the advantages of keeping inventory. At any given point in time, an enterprise may have at least two options with respect to a unit of a particular item 135. The enterprise may hold the unit within fulfillment center 100 until it is sold to a customer through a sales channel, or may dispose of the unit as soon as possible through one or more alternative disposition channels. When the enterprise selects the latter option, it may have to rebuy additional units of the same product at a later date, for example, to satisfy an increased demand or simply to maintain a certain level of inventory over time. As described in greater detail below, in some situations it may be more economically advantageous for the enterprise to dispose of a certain quantity of the inventory item (and reduce or eliminate its associated holding costs) until a subsequent rebuy period.

A sales channel may encompass any suitable method, technique or relationship for conducting a transaction with a typical customer of an enterprise, in response to an actual or expected customer order or request. As such, a sales channel may include various features configured to present to customers information about items 135 (e.g., availability and pricing information, product details, images, etc.) as well as features configured to support the receipt and processing of customer orders or requests. For example, a retail enterprise that generally sells merchandise to end consumers (e.g., as merchandise not generally intended for resale as new) may sell through an online, web-based channel that may include an online catalog or portal configured to display information about items 135, a web-based order entry system such as a virtual shopping cart or other system, a status tracking tool through which customers may track the status or progress of orders, a search engine, or any of a number of other features suitable for promoting the conduction of sales transactions.

In contrast, a disposition channel may generally encompass any suitable method, technique or relationship for disposing of units of an item 135 as an alternative to a sale through a sales channel. In various embodiments, a disposition channel may include a vendor return channel through which units of an item 135 may be returned to a vendor or supplier for credit, a liquidation channel through which units may be liquidated through a third party, a salvage channel through which units may be disposed for scrap or salvage value, or a donation channel through which units may be donated, e.g., to a charitable cause. In other embodiments, a disposition channel may include a second sales channel that is an alternative to a preferred sales channel. For example, a disposition channel may include a promotional sales channel through which units of an item 135 are offered at a discount (e.g., according to the condition of the units, quantity on hand, or other relevant factors), bundled with units of other items 135 (e.g., as part of a "buy X, get Y free" offer), offered for sale through an auction or bidding process, offered for sale through a promotional or marketing partner affiliated with the enterprise, or any other suitable disposition arrangement. In some embodiments, different terms and conditions may apply to a sale of an item 135 that occurs through a disposition channel versus a sale that occurs through a sales channel. For example, a customer buying a unit of an item 135 via sales channel may receive certain return, exchange, warranty or satisfaction privileges or guarantees that may not apply to purchases of that item 135 through a disposition channel.

The value of a unit of a given item 135 may generally correspond to the economic consideration that may be obtained for it via a specific channel. For example, a unit of an item 135 may be sold via sales channel for a particular price, which may be indicative of the value of a unit of item 135 with respect to sales channel. On the other hand, the same unit of the same item 135 may be disposed of via disposition channel for a different level of economic consideration. For example, the unit may be returned to a vendor for a percentage of the original purchase cost of the unit, sold to a liquidator, or disposed of via any other suitable method such as described above. Economic consideration received in exchange for an item 135 may typically include monetary consideration, but may also include other consideration such as credit relating to current or future transactions, bartered goods or services, or any other form of value agreeable to the parties participating in the exchange.

When considering revenue alone, it may often be preferable to sell a given item 135 via sales channel rather than to dispose of given item 135 via a disposition channel. However, an enterprise may have little direct control over when a sale event via sales channel may occur, whereas an enterprise may have considerably greater control over initiating disposition via a disposition channel. In certain circumstances, holding costs that accrue until units of an item 135 are sold via a sales channel may reduce or even eliminate the difference between the sale value and the disposition value of the units. Consequently, even though greater revenue may be realized by waiting for a sale via sales channel to occur, in certain circumstances overall economic value may be preserved or improved by electing to dispose of units of an item 135 via a disposition channel.

Furthermore, in some cases, after units of an item 135 are disposed via a disposition channel, the enterprise may find itself rebuying additional units of that item. For example, inventory may need to be replenished in order to avoid out-of-stock, the demand for the item may have increased (e.g., a seasonal product), etc. Typically, the cost of rebuying inventory is higher than its disposition value. Therefore, similarly as discussed above, if holding costs were ignored, it would appear to be generally more advantageous to simply hold on to the present inventory—as opposed to disposing of it through a disposition channel and later rebuying it in order to make a sale through a normal sales channel. However, when holding costs are taken into account, there may be situations where the difference between the rebuy costs and the disposition value is larger than the accrued holding costs over a particular period of time. In those situations, it may be more beneficial for the enterprise to dispose of at least a certain quantity of the item (thus foregoing holding costs for a period of time) and then replenishing inventory at a later date.

By examining the value that may be received for a given item 135 via a disposition channel in conjunction with the rebuy and holding costs associated with a given item 135, a breakeven holding time may be determined at which holding costs approximately equal the difference in value between the rebuy costs and the disposition value of the given item 135. In some embodiments, the breakeven holding time may then be used to determine an inventory policy that may cause actions to be taken against items 135, such as whether to hold or dispose of items 135.

At a general level of abstraction, the logic behind an inventory policy that takes into account a breakeven holding time may be summarized as follows: Suppose an item 135 may be purchased (or "re-bought") through a purchasing channel for a higher cost than is expected to be received by disposing of the item 135 through a disposition channel. Then, it may be expected that any given unit of item 135 may be profitably held in inventory until the costs of holding the unit approximately equal the difference between the rebuy cost and the disposition value. After this point, referred to as the breakeven holding time, accumulated holding costs may exceed the difference such that it would be more profitable to dispose of the item now and rebuy it later. For example, a particular item 135 may have a rebuy cost of 6 dollars and a disposition value of 1 dollar, and it may incur holding costs of 1 dollar per week. Thus, the breakeven holding time for the particular item 135 may be 5 weeks, at which time the accumulated holding costs may be expected to total 5 dollars, which is equal to the difference between the rebuy cost and disposition value.

In some cases, the breakeven holding time may be used in determining a healthy level of inventory. Generally speaking, a healthy level of inventory of an item 135 may correspond to the total expected demand for that item 135 through the breakeven holding time. That is, if the breakeven holding time represents the "tipping point" for an item—i.e., the point at which the expected economic loss attributable to removing the item from inventory now and re-buying it at the end of a specified time period is approximately equal to the expected loss due to holding costs during that period. The total amount of inventory of the item may be considered healthy (e.g., not at risk of incurring excessive holding costs) if the inventory would be expected to be sold via a sales channel prior to the breakeven holding time. In other words, if the inventory on hand of an item is expected to "turn over" (e.g., be sold and possibly replaced) prior to the breakeven holding time, the inventory on hand may be considered healthy.

For instance, referring to the previous example, if the demand or sales rate of particular item 135 is 2 units per week, then given the breakeven holding time of 5 weeks, a healthy inventory level for the particular item 135 may be 10 units. To the extent an enterprise may currently hold inventory units in excess of 10 units, the excess units may be deemed unhealthy. As discussed above, in this particular example it may be more economically beneficial for the enterprise to simply dispose of the excess units through a disposition channel and re-buy those units at a later time.

In an embodiment, a breakeven holding time and a healthy inventory level for an item 135 may be determined as follows. Let r represent the rebuy costs associated with rebuying item 135 through a purchasing or replenishment channel and let d represent the disposition value of item 135. In some cases, the disposition value d may be net of associated disposition costs. If more than one disposition channel exists, the disposition channel with the highest current disposition value may be chosen for the analysis. Moreover, if more than one purchasing channel exists, the purchasing channel with lowest rebuy cost may be selected. Additionally or alternatively, an average disposition value and/or an average rebuy cost may be used. Let h represent the rate of holding cost accrual for a unit of item 135 per unit of time (e.g., dollars per week, or per some other suitable unit of time). The total breakeven holding time $T_{be}$ for item 135 may then be determined by setting the potential loss from rebuying the item after its disposition (r–d) equal to the potential loss from holding item 135 until the breakeven holding time, and then solving for $T_{be}$. That is, $$r-d = hT_{be} \qquad \text{Equation (1)}$$

This yields:

$$T_{be} = \frac{r-d}{h} \qquad \text{Equation (2)}$$

Given $T_{be}$, the healthy inventory level H of item 135 may be determined as follows:

$$H = \int_0^{T_{be}} D(t)\,dt \qquad \text{Equation (3)}$$

where D(t) represents the demand (e.g., sales demand) for item 135 as a function of time. That is, the definite integral of demand from time 0 (e.g., the current time) through time $T_{be}$ may represent the total expected demand over that interval of time, which may correspond to a healthy inventory level. It is noted that in some embodiments, D(t) may be given by a discrete rather than a continuous function. Correspondingly, discrete summation rather than integration may be employed to determine H.

In some embodiments, the accrued holding cost and the difference between rebuy costs and disposition value may not be exactly equal, but rather equal within some equality threshold. That is, two values may be considered equal if their difference is less than the equality threshold, which may be expressed as an absolute value (e.g., a given number of units) or a relative value (e.g., a percentage). For example, units of time or cost may not be arbitrarily divisible. Consequently, rounding or truncation of values may occur during evaluation, which may lead to inexact computation.

In some embodiments, the healthy inventory level H and breakeven time $T_{be}$ may be determined relative to another inventory policy. For example, an enterprise may establish a target inventory level S of a particular item 135 that may be used for planning and managing inventory levels of that item 135. In some embodiments, S may be determined by an optimization process configured to determine an optimal level of inventory given various parameters, such as customer demand, supplier lead time, market dynamics, expected profit margins or other factors. In other embodiments, S may simply be given as an arbitrary inventory level target. Generally speaking, S may be determined in such a way that a desired service level for item 135 will be achieved for at least a period of time T (the "coverage period") with a given degree of certainty. That is, S may denote the amount of inventory needed to cover expected demand to the degree required by the desired service level (e.g., with a certain level of delay or other service parameters) for a period of time T, with a certain probability or certainty. For example, the supply and demand characteristics of a particular item 135 may be analyzed or modeled to determine that 100 units of that item 135 are necessary to provide two weeks of inventory coverage with a probability of 99%. Accordingly, in some embodiments, a healthy inventory level may be determined relative to a target inventory level.

The determination of healthy inventory levels described above, however, does not specifically take into consideration expiration dates (or shelf life) of items 135. In some embodiments, if the expiration time associated with a given item 135 is identified, an enterprise may determine whether the expiration time is shorter than the breakeven holding time calculated with Equation (2). If it is determined that item 135 will expire after the breakeven holding time, then typically no further action is deemed necessary, at least with respect to the expiring units. On the other hand, if the expiration time of item 135 is shorter than the breakeven holding time, an additional amount of unhealthy inventory may be removed. Various techniques for determining amounts of expiring items to be removed from inventory are disclosed in the sections that follow.

As described above, in some embodiments, inventory management system 150 may be configured to record and analyze the state of inventory items 135 within fulfillment center 100. For example, inventory management system 150 may be implemented as one or more software processes configured to execute on one or more computer systems to create records of the arrival, storage, picking, sale, disposition or other events relating to items 135 with respect to fulfillment center 100. In an embodiment, inventory management system 150 may be configured to analyze the inventory of a particular item 135, determine whether the inventory level is healthy or unhealthy in accordance with the model derived above, and initiate or suggest action, such as disposition, to be taken with respect to any unhealthy inventory.

In some embodiments, variations in the inventory health model described above may be used to determine levels of healthy and unhealthy inventory. For example, whereas equations (1)-(3) relate specifically to re-procurable items, there may be situations where a "hold and sale" model may better describe an enterprise's inventory policy towards a particular inventory item. In those situations, the items' sale value (or average sales value) may replace the item's rebuy costs (or average rebuy costs) in equations (1) and (2). Moreover, in alternative embodiments, other suitable inventory health models may be employed.

An Inventory Health Software Module

Figure 2:
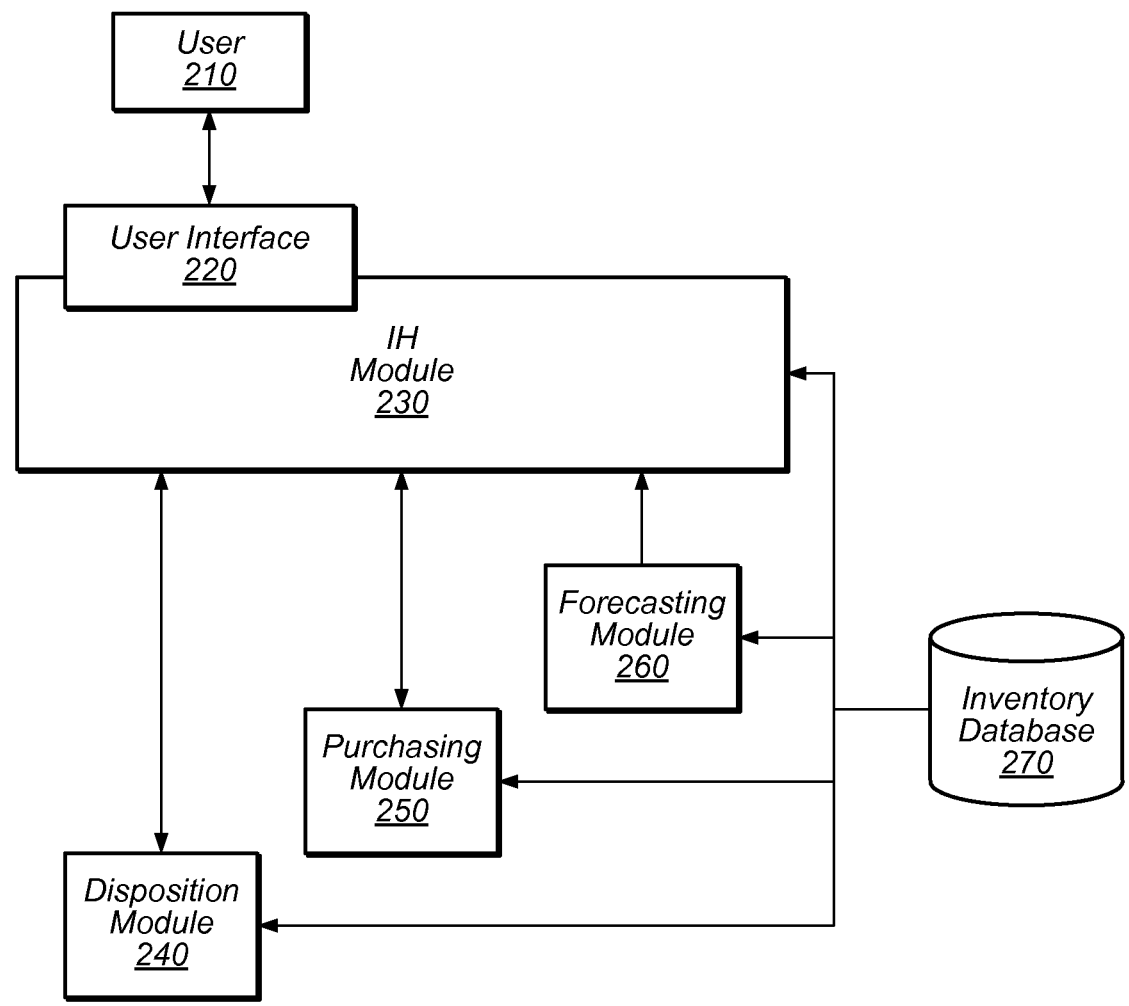
FIG. 2 is a block diagram illustrating an inventory health (IH) software module according to some embodiments.

Referring to FIG. 2, a block diagram of an inventory health (IH) software module is depicted according to some embodiments. As illustrated, IH module 230 provides user interface 220, which allows user 210 to interact with IH module 230 and access some or all of its various features. In some implementations, user interface 220 may be a graphical user interface (GUI) or a web-based user interface (WUI) that implements Java™, AJAX, Adobe® Flex®, Microsoft® .NET, or similar technologies to enable real-time user control. In other cases, user interface 220 may be a command line interface or the like.

IH module 230 may utilize a set of rules or specifications (e.g., an Application Programming Interface (API)) to access and/or make use of the services and resources provided by disposition module 240, purchasing module 250, forecasting module 260, and/or inventory database 270. In some embodiments, one or more of these various elements may have its own user interface to allow independent user access. Moreover, generally speaking some or all of modules or elements 240-270 may be bi-directionally interconnected such that each such module is configured to send and receive messages from other modules. As shown in this particular embodiment, IH module 230 may communicate bi-directionally with disposition module 240 and purchasing module 250. IH module may also receive information from forecasting module 260, and each of modules 230-260 may receive information from inventory database 270.

Disposition module 240 may include algorithms and/or data structures that are configured to determine a disposition value (d) for one or more of inventory items 135 stored in inventory database 270 and to provide such disposition value to IH module 230. In some cases, disposition module 240 may determine two or more disposition values for two or more corresponding disposition channels (e.g., sale, return to manufacturer, etc.), and may provide the highest disposition value (d) to IH module 230. Additionally or alternatively, disposition module 240 may use an average (or some other combination) of the two or more disposition values. To make these determinations, disposition module 240 may include, for example, a list of disposition channels and associated disposition values. In addition, disposition module 240 may be configured to receive an indication or recommendation from IH module 230 as to a quantity of a particular item to be removed from inventory (e.g., at least a portion of unhealthy inventory) and/or the timing of such removal (e.g., immediately, within a period of time, etc.).

Similarly, purchasing module 250 may be configured to determine a rebuy cost (r) for one or more of inventory items 135 stored in inventory database 170 and to provide it to IH module 130. In some cases, purchasing module 250 may determine two or more rebuy costs for two or more purchasing channels (e.g., from a manufacturer, distributor, etc.), and may provide the highest rebuy cost (r) to IH module 230. Alternatively, purchasing module 250 may use an average (or some other combination) of the two or more rebuy costs. Again, to make these determinations, purchasing module 250 may include a list of purchasing channels and associated rebuy costs. Moreover, purchasing module 250 may be configured to receive an indication from IH module 230 as to a quantity of a particular item to be repurchased and/or the timing of such repurchasing.

Forecasting module 260 may be configured to determine a demand forecast (D) for one or more of items 135 recorded in inventory database 270. In general, forecasting module 260 may estimate the quantity of a product that is likely to be sold within a specified planning horizon. For example, forecasting module 260 may employ quantitative methods and/or historical data to predict future demand for a given item. In some cases, a demand forecast may be represented by a continuous curve. In other cases, a demand forecast may be represented by a discrete function.

Inventory database 270 may generally be configured to store any kind of data related to items 135. For example, inventory database 270 may store records that relate an identifier for a particular item 135 (e.g., a vendor or merchant's stock keeping unit (SKU) identifier) with an identifier that may be specific to fulfillment center 100. Inventory database 270 may also include information regarding the quantity of each item presently in stock, for example. Moreover, for one or more of items 135, inventory database 270 may contain an associated expiration date, expiration time, shelf life, or the like.

In some embodiments, inventory database 270 may include any suitable type of application or data structure that may be configured as a persistent data repository. For example, inventory database 270 may be configured as a relational database that includes one or more tables of columns and rows and that may be searched or queried according to a query language, such as a version of Structured Query Language (SQL). Alternatively, inventory database 270 may be configured as a structured data store that includes data records formatted according to a markup language, such as a version of eXtensible Markup Language (XML). In other embodiments, inventory database 270 may be implemented using one or more arbitrarily or minimally structured data files managed and accessible through any suitable type of application.

Each of modules or elements 240-270 may process information that changes over time. For example, a new disposition channel may become available for a given item 135, or an existing disposition channel may no longer be available for that same item. Also, a disposition value of an item may decrease or increase over time. Similarly, new and existing purchasing channels, as well as corresponding rebuy costs, may be subject to change. Demand forecast may also be a function of the planning horizon and/or may vary at any given time. Further, the contents of inventory database 270 may change when units of new or existing items are shipped to or from fulfillment center 100. Therefore, in some embodiments, the information provided to and/or generated by each of modules 240-270 may be continuously or periodically updated to reflect changes in disposition, repurchasing, forecast, and/or inventory conditions. In some cases, such updates may be automatically performed. In other cases, some or all of these updates may be implemented by user 210.

In some embodiments, one or more of IH module 230, disposition module 240, purchasing module 250, forecasting module 260, and inventory database 270 may be part of inventory management system 150, although these modules need not reside within fulfillment center 100. Moreover, when an enterprise operates two or more fulfillment centers or warehouses, elements 230-270 may be common to some (or all) such fulfillment centers. In some embodiments, elements 230-270 may reside in a number of different computing systems distributed throughout an enterprise. For example, certain financial data may be stored in an accounting database associated with an accounting department that may be distinct from elements 240-270.

Removing Expiring Items from Inventory

Figure 3:
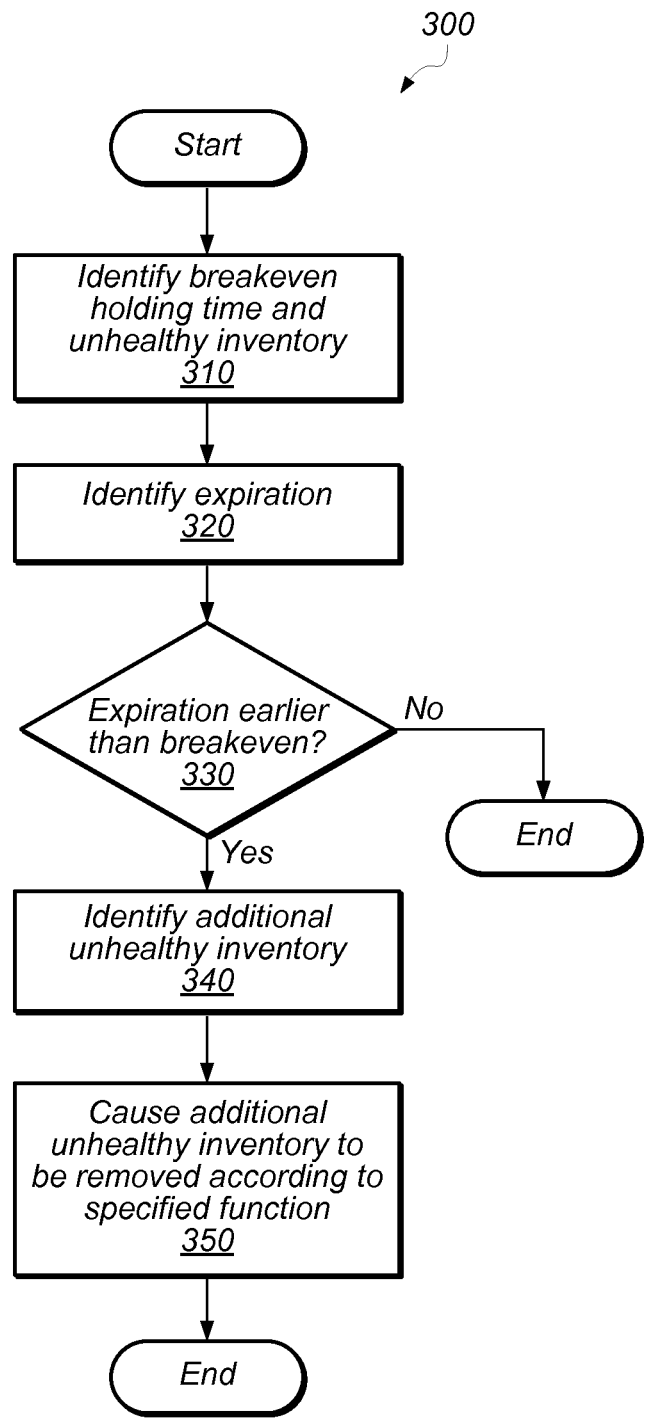
FIG. 3 is a flowchart of a method for removing expiring items from inventory according to some embodiments.

Referring to FIG. 3, a flowchart of a method for removing expiring items from inventory is depicted. In some embodiments, one or more of the operations described with respect to method 300 may be implemented by IH module 230 of FIG. 2. In some situations, a particular inventory item 135 may be selected for analysis by user 210. In other situations, the inventory item may be automatically selected as part of a periodic or routine inventory analysis. As illustrated, at 310, method 300 identifies a breakeven holding time ($T_{be}$) for the selected inventory item 135.

In one example, the breakeven holding time ($T_{be}$) may be calculated based on Equation (2) described above. For instance, IH module 230 may receive a message from disposition module 240 containing an indication of a disposition value (d) for a particular inventory item 135, and another message from purchasing module 250 that includes an indication of the rebuy cost (r) for that same item. Meanwhile, IH module 230 may receive holding cost (h) information from inventory database 270, for example. Based a least in part on these values, IH module may employ Equation (2) to obtain the breakeven holding time ($T_{be}$) under the expected conditions. In some embodiments, IH module 230 may be configured to allow the user 210 to change one or more values provided by other software modules. This feature may, for example, allow user 210 to simulate varying conditions in anticipation of known or expected changes that may not have yet been updated in its respective module. In another example, the breakeven holding time ($T_{be}$) may be directly provided by user 210, thus at least partially bypassing the calculation of Equation (2).

In addition to calculating the breakeven holding time ($T_{be}$), method 300 may also determine a quantity of healthy and/or unhealthy inventory at 310 based on Equation (3). For instance, IH module 230 may receive a demand forecast distribution from forecasting module 260, and integrate that distribution up to the breakeven holding time ($T_{be}$). As discussed above, the result of this calculation may provide a quantity of healthy inventory items. IH module may also receive a total quantity of inventory items from inventory database 270, and calculate a first quantity of unhealthy inventory as the difference between the total quantity of items and the result of Equation (3). These quantities may be further adjusted, for example, by taking into account a target inventory level or the like.

At 320, method 300 may identify an expiration date, expiration time, or shelf life of the selected item 135. For example, an expiration date for item 135 may be obtained from inventory database 270. Additionally or alternatively, user 210 may input an expiration date directly into IH module 230. At 330, method 330 may determine whether the expiration time is shorter than the breakeven holding time ($T_{be}$). If it is not, then no further action may be taken with respect to the expiring items. Otherwise, at 340, method 300 may identify an additional quantity of unhealthy inventory of item 135. For example, method 300 may recalculate Equation (3), but this time substituting the breakeven holding time ($T_{be}$) with the item's expiration date. In some cases, this procedure produces a second quantity of unhealthy inventory items, and the difference between the second and first quantities may provide the additional quantity of unhealthy inventory items that is due to their expiration.

At 350, method 300 may cause that the additional quantity of unhealthy inventory items due to expiration be removed from fulfillment center 100. In an embodiment, IH module 230 may be configured to generate a report or indication notifying user 210 of the healthy or unhealthy status of inventory and advising that a particular action (e.g., hold or dispose) be taken. That is, IH module 230 may advise or indicate that an action such as disposition should be taken, while the actual undertaking of the indicated action is performed at the discretion of another agent or system. In other embodiments, IH module 230 may be configured to initiate the disposition process (e.g., by messaging disposition module 240) if unhealthy inventory exists, for example by contacting a vendor to arrange a return, directing that unhealthy inventory be picked and packaged for return, or other actions suitable to a given disposition channel.

In alternative embodiments, method 300 may include an optional operation between blocks 340 and 350 that determines whether removal of the additional quantity of unhealthy inventory items (due to expiration) would cause inventory levels to drop below the target inventory levels for that item. If so, the target inventory level may provide a cap to the amount of additional inventory items that are actually removed in block 350. In other embodiments, however, the target inventory level may be applied only to non-expiring units—that is, those units may be sold according to their forecast (at least until the breakeven holding time ($T_{be}$)). In these embodiments, additional quantity of unhealthy inventory items due to expiration may still be removed, even if removal would cause inventory levels to drop below target.

In some embodiments, an inventory removal function may be used to identify a fraction or a portion of the additional quantity of unhealthy items that should be disposed at a given time. For example, rather than identifying the quantity of unhealthy items that is likely to expire and then immediately causing the disposal of all those units, method 300 may distribute those units in time in a manner that accounts for potential changes in demand forecast, for example. Generally speaking, the inventory removal function may be any suitable function such as, for example, a linear, parabolic, or exponential function, as described in more detail with respect to FIG. 5.

Figure 4:
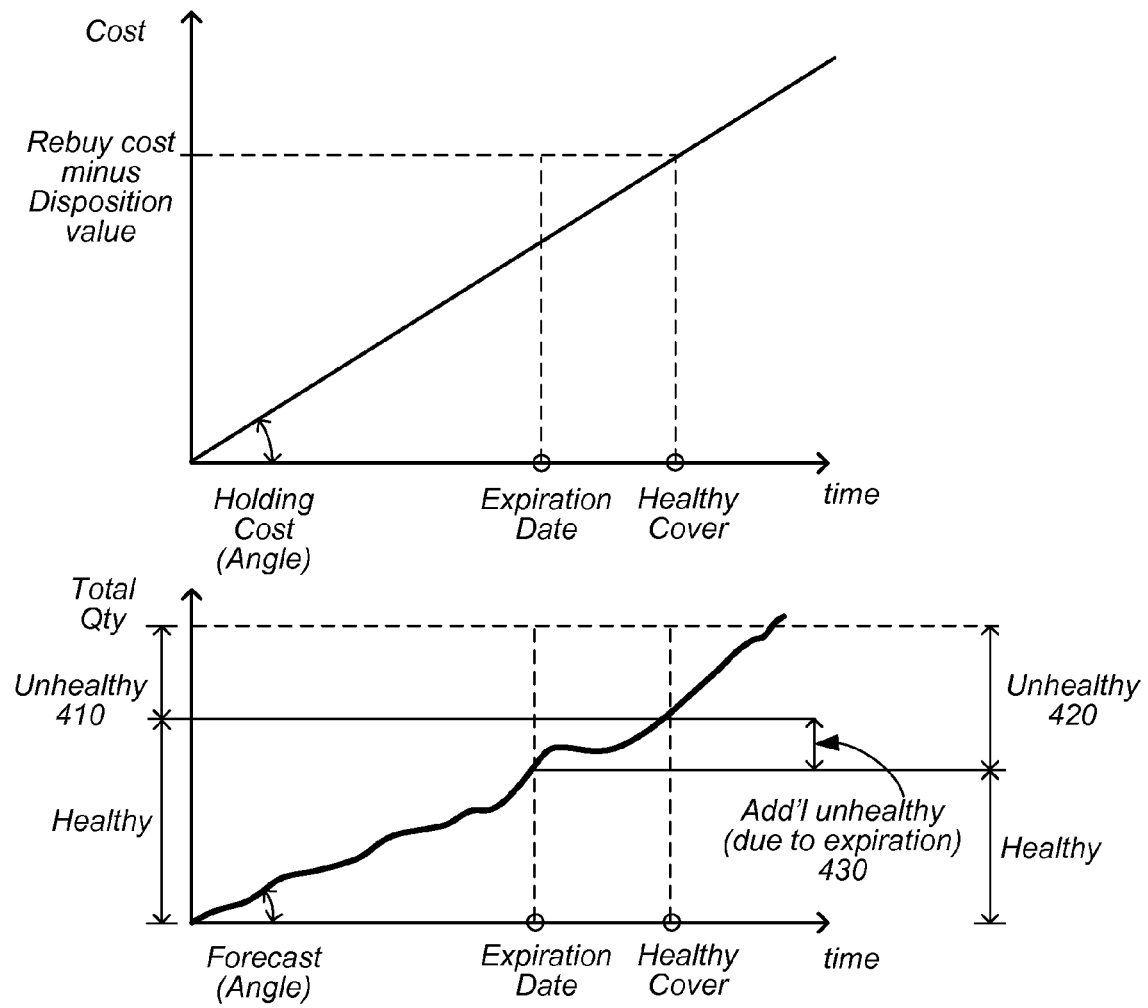
FIG. 4 includes graphs that illustrate effects of expiration dates in an inventory removal scenario according to some embodiments.

Referring now to FIG. 4, graphs that illustrate the impact of expiration dates in a typical inventory removal scenario are shown according to some embodiments. These graphs may be understood, for example, when examined in conjunction with method 300 shown in FIG. 3. As illustrated, the top and bottom graphs are aligned with respect to time. The top graph depicts cost as a function of time, and indicates the difference between rebuy cost and disposition value for a particular inventory item as that difference becomes consumed by the holding costs associated with that item. At the breakeven holding time ($T_{be}$) —indicated in the graph as a number of healthy weeks of cover—the difference between rebuy costs and disposition value is the same as the holding costs. Therefore, the breakeven holding time ($T_{be}$) represents the point in time where it may be more economically advantageous for an enterprise to dispose of the items and rebuy them later in order to forego its corresponding holding costs. As previously discussed, this aspect of the top graph corresponds to the calculations related to Equation (2) performed at block 310 of method 300.

The bottom graph of FIG. 4 shows a demand forecast for the selected inventory item plotted against a quantity axis. As such, the breakeven holding time ($T_{be}$) identifies the healthy and unhealthy quantities of that item that are in inventory. The first unhealthy inventory quantity is shown as element 410. As previously discussed, element 410 corresponds to the calculations related to Equation (3), and also performed at block 310 of method 300.

At 320, an expiration date for the selected item may be identified. In this particular example, the expiration date is expected to take place sooner than the calculated breakeven holding time ($T_{be}$). Accordingly, the expiration date is shown to the left of the breakeven holding time ($T_{be}$) in both the top and bottom graphs. In the bottom graph, it may be noted that the expiration date causes a second quantity of unhealthy inventory to be identified as element 420. The difference between the second and first portions of unhealthy inventory (i.e., the difference between elements 420 and 410) may be seen as an additional unhealthy inventory that is due to the expiration of the selected item. The additional unhealthy inventory is shown in the bottom graph as element 430. Moreover, this aspect of the bottom graph corresponds to block 340 of method 300.

Figure 5:
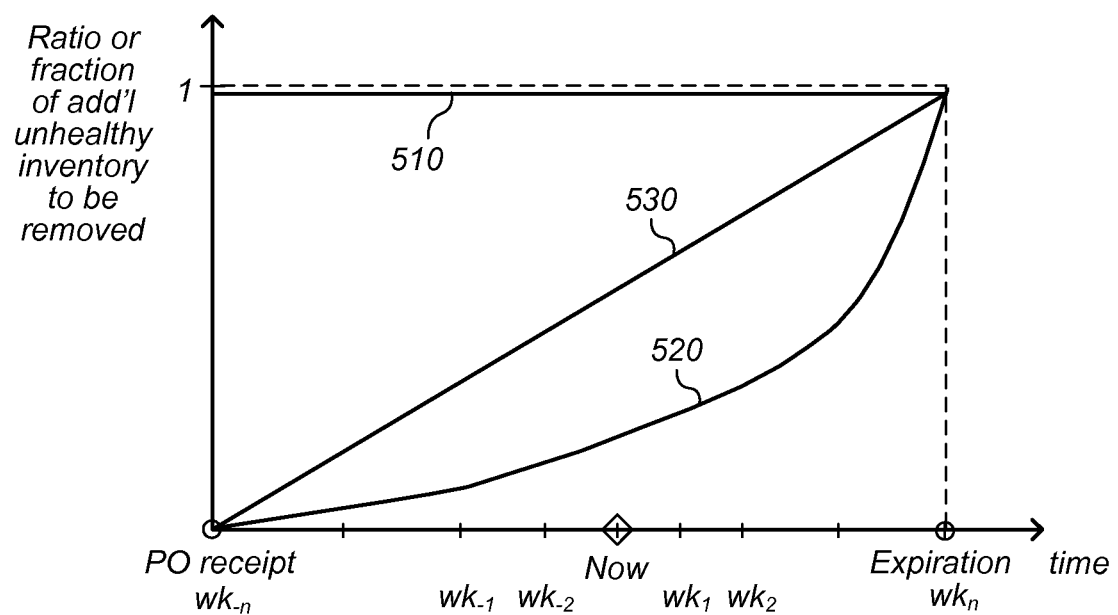
FIG. 5 is a graph of functions that may be used in the removal of expiring items from inventory according to some embodiments.

Turning now to FIG. 5, a graph of functions that may be used in the removal of expiring items from inventory. In some embodiments, linear function 510 or exponential function 520 may be used to remove additional unhealthy inventory that is due to an expiration (i.e., element 430 of FIG. 4). As illustrated, the graph plots a removal ratio against time, where the removal ratio indicates a fraction of the additional unhealthy inventory 430 to be removed at a particular time (e.g., a ratio of 1 indicates that the entire additional unhealthy inventory 430 should be removed at once, and a ratio of 0 indicates that none of additional unhealthy inventory 430 should be removed). In some cases, functions 510 and 520 may indicate the amount of inventory to be removed at the time of execution of method 300. In other cases, these functions may indicate the amount of inventory to be removed at future point in time (e.g., X units of item 35 should be removed from inventory within the next Y days).

In certain embodiments, linear function 510 may cause a fixed amount of additional inventory 430 to be removed without regard to time. That is, every time that method 300 is performed, it may apply linear inventory removal function 510 to indicate that a particular number of units of item 135 be removed regardless of when the expiration date will actually occur. As such, the linear model may be particularly well suited for situations where the chances of the actual demand increasing prior to the expiration date are relatively low.

In other embodiments, exponential inventory removal function 520 may allocate varying portions of additional unhealthy inventory 430 to be removed as a function of time. For instance, exponential function 520 may determine that the additional quantity of the inventory item be removed according to a removal ratio, and the removal ratio may increase exponentially between a time of purchase of the inventory item and the expiration time. As such, the removal ratio may cause that a smaller portion of the additional quantity of the inventory item 430 be removed closer to the time of purchase, and that a larger portion of the additional quantity of the inventory item 430 be removed closer the expiration time. In other words, in contrast with linear function 510, the exponential function 520 is stateful with respect to when its calculation happens relatively to an earlier point in time (e.g., purchase order (PO) receipt date, average PO receipt date, etc.) and/or a later point in time (e.g., inventory age, expiration date, etc.). In some embodiments, the exponential inventory removal function may effectively increase holding costs exponentially up from zero to 100 times the difference between rebuy costs and the disposition value of the item; although other curves may be used in different situations.

As noted above, other inventory removal functions may be similarly implemented (e.g., a parabolic function, a logarithmic function, a custom function, etc.). For example, another linear function 530 with a fixed angle (other than zero) may have a similar effect as exponential inventory removal function, in that less units are removed closer to a particular point in time and more units are removed closer to the expiration. In this case, the quantities to be removed week after week may increase a constant rate. In some embodiments, the type of inventory removal function may be implemented may corresponding to a particular product, product line, time of the year (e.g., in the case of seasonal products), etc. Additionally or alternatively, user 210 may be allowed to modify a inventory removal function in other to perform alternative simulations or the like.

An Illustrative Computer System

In some embodiments, some or all of the methods or techniques described above may be implemented as program instructions and data capable of being stored or conveyed via a computer-accessible medium. Such methods or techniques may include, for example and without limitation, the functions of inventory management system 150 and/or IH module 230, as well as the methods illustrated in FIGS. 3-5 and any suitable variations thereof. Such program instructions may be executed to perform a particular computational function, such as inventory health metric generation and analysis, expiring item removal analysis, purchase offer analysis, purchase and/or sales management, operating system functionality, applications, and/or any other suitable functions.

Figure 6:
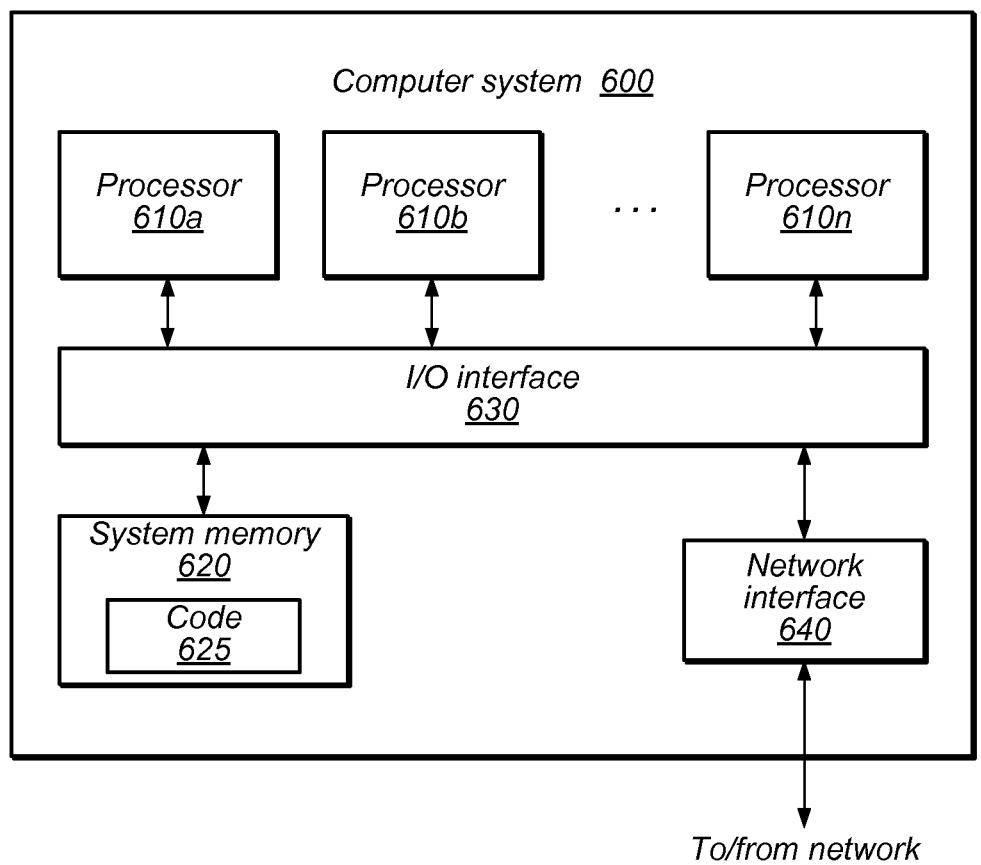
FIG. 6 is a block diagram a computer system according to some embodiments.

An embodiment of a computer system including computer-accessible media is illustrated in FIG. 6. In the illustrated embodiment, computer system 600 includes one or more processors 610 coupled to a system memory 620 via an input/output (I/O) interface 630. Computer system 600 further includes a network interface 640 coupled to I/O interface 630. In some embodiments, inventory management system 150 and/or IH module 230 may be implemented using a single instance of computer system 600, while in other embodiments multiple such systems may be configured to host different portions or thereof. For example, in an embodiment some data sources or services (e.g., purchasing management services) may be implemented via instances of computer system 600 that are distinct from those instances implementing other data sources or services (e.g., order entry/fulfillment services).

In various embodiments computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be a general-purpose or embedded processor implementing any of a variety of instruction set architectures (ISAs), such as the x86, PowerPC®, SPARC®, or MIPS ISAs, or any other suitable ISA. In multiprocessor systems, each of processors 610 may commonly, but not necessarily, implement the same ISA.

System memory 620 may be configured to store instructions and data accessible by process 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 620 as code 625.

In an embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, for example. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 620 may be an embodiment of a computer-accessible medium configured to store program instructions and data as described above. However, in other embodiments, program instructions and/or data may be received, sent or stored upon different types of computer-accessible media. Generally speaking, a computer-accessible medium may include tangible storage media or memory media such as magnetic or optical media, e.g., disk or CD/DVD-ROM coupled to computer system 600 via I/O interface 630. A computer-accessible medium may also include any volatile or non-volatile media such as RAM (e.g., SDRAM, DDR SDRAM, RDRAM, SRAM, etc.), ROM, etc, that may be included in some embodiments of computer system 600 as system memory 620 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

Additionally, some or all of the methods or techniques described above and illustrated, for example, in FIGS. 3-5 may be implemented as a web service that may be performed on behalf of clients requesting such a service. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., query functions, electronic commerce functions, generic data storage or computational functions, etc.) to external customers (or, in some embodiments, internal clients) via a web services interface. Applications could then access the exposed data and/or functions via the web services interface, even though the accessing application may be configured to execute on an entirely different platform (e.g., a different operating system or system architecture) than the platform hosting the exposed data or functions. Similarly, an enterprise may elect to provide clients with access to inventory management analysis services, such as inventory health determination, expiring product analysis, purchase offer analysis, counteroffer analysis or other such services. For example, clients may provide inventory details via a web services interface and request various kinds of analysis through that interface. Alternatively, an enterprise may elect to provide physical management of inventory on behalf of clients, and may analyze client-owned inventory in a manner similar to enterprise-owned inventory, exposing the results of such analysis to clients as a web service.

In some embodiments, provisioning a web service may encompass the use of particular protocols which may be executable (e.g., as part of code 625) to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in an embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In some embodiments, web services request and response data is exchanged between a client and the service provider through the use of messages or documents formatted as platform-independent structured data, such as a document formatted in compliance with a version of eXtensible Markup Language (XML). For example, in an embodiment a web services request to provide inventory health information for a given inventory item may be embodied in an XML document including fields identifying the item of interest, the type of data requested (e.g., inventory health data), and possibly other fields, in which each field is delimited by an XML tag describing the type of data the field represents. The response to such a request from the web service provider may include an XML document containing the requested data. In certain embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in an embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as command parameters in a REST-type architecture. Other suitable configurations of web services architectures are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
performing, by one or more computers:
determining a breakeven holding time for an inventory item based, at least in part, on a disposition value of the inventory item, a cost of re-buying the inventory item, and a cost of holding the inventory item in the inventory;
calculating, based at least in part on a demand forecast for the inventory item and on the breakeven holding time, a first quantity of the inventory item to be removed from the inventory;
identifying an expiration time corresponding to the given inventory item;
in response to the expiration time being shorter than the breakeven holding time, calculating a second quantity of the inventory item, wherein a difference between the second and first quantities represents an additional quantity of the inventory item to be removed from the inventory; and
causing at least one portion of the additional quantity of the inventory item to be removed from the inventory according to an inventory removal function.

2. The method of claim 1, wherein the breakeven holding time corresponds to a length of time wherein an economic effect of holding the inventory item in the inventory is approximately the same as an economic effect of disposing of the inventory item and later re-buying the inventory item.

3. The method of claim 1, wherein the breakeven holding time is equal to a difference between the cost of re-buying the inventory item and the disposition value of the inventory item, divided by the cost of holding the inventory item in inventory per unit of time.

4. The method of claim 1, wherein the inventory item is a consumable product and the expiration time corresponds to an expiration date.

5. The method of claim 1, wherein the expiration time corresponds to a declining stage in the inventory item's lifecycle.

6. The method of claim 1, wherein the inventory removal function is a linear function.

7. The method of claim 1, wherein the inventory removal function is an exponential function.

8. The method of claim 7, wherein the exponential function determines that the additional quantity of the inventory item be removed according to a removal ratio, and wherein the removal ratio increases exponentially between a time of purchase of the inventory item and the expiration time.

9. The method of claim 8 wherein the removal ratio causes a smaller portion of the additional quantity of the inventory item to be removed closer to the time of purchase, and a larger portion of the additional quantity of the inventory item to be removed closer the expiration time.

10. A system, comprising:
 at least one processor; and
 a memory coupled to the at least one processor, wherein the memory stores program instructions, and wherein the program instructions are executable by the at least one processor to cause the system to:
  determine a first quantity of an inventory item to be removed from an inventory, wherein an economic benefit of disposing of the first quantity of the inventory item and re-buying the first quantity of the inventory item at the end of a time period is greater than an economic benefit of holding the first quantity of the inventory item in the inventory through the time period;
  determine a second quantity of the inventory item to be removed from the inventory due to an expiration date; and
  cause at least a portion of a difference between the second and first quantities of the inventory item to be removed from the inventory using an inventory removal function.

11. The system of claim 10, wherein to determine the first quantity of the inventory item, the program instructions are executable by the at least one processor to further cause the system to determine a breakeven holding time for the inventory item based, at least in part, on a disposition value of the inventory item, a cost of re-buying the inventory item, and a cost of holding the inventory item in the inventory.

12. The system of claim 11, wherein to determine the first quantity of the inventory item, the program instructions are executable by the at least one processor to further cause the system to integrate a demand forecast for the inventory item up to the breakeven holding time.

13. The system of claim 10, wherein the inventory removal function is linear.

14. The system of claim 10, wherein the inventory removal function determines that the at least a portion of the difference between the second and first quantities of the inventory item be removed exponentially between a time of purchase of the inventory item and the expiration date.

15. The system of claim 10, wherein the inventory removal function determines that a smaller portion of the difference between the second and first quantities of the inventory item be removed closer to a date of purchase of the inventory item, and that a larger portion of the difference between the second and first quantities of the inventory item be removed closer the expiration date.

16. A non-transitory computer-readable storage medium having program instructions stored thereon that, upon execution by a computer system, cause the computer system to:
 calculate a first number of units of an inventory item to be removed from an inventory to reduce a potential economic loss associated with stocking the inventory item; and
 determine a second number of units of the inventory item in addition to the first number of units to be removed from the inventory due to an expiration of the inventory item in accordance with an inventory removal function.

17. The non-transitory computer-readable storage medium of claim 16, wherein to calculate the number of units of the inventory item to be removed from the inventory, the program instructions further cause the computer system to calculate a breakeven holding time for the inventory item, wherein the breakeven holding time is equal to a difference between the cost of re-buying the inventory item and the disposition value of the inventory item, divided by the cost of holding the inventory item in inventory per unit of time.

18. The non-transitory computer-readable storage medium of claim 16, wherein the expiration is represented by a probability distribution.

19. The non-transitory computer-readable storage medium of claim 16, wherein the inventory removal function indicates that the second number of units of the inventory item be removed exponentially between a time of purchase of the inventory item and the expiration of the inventory item.

20. The non-transitory computer-readable storage medium of claim 16, wherein the inventory removal function determines that a smaller portion of the second number of units of the inventory item be removed closer to a date of purchase of the inventory item, and that a larger portion of the second number of units of the inventory item be removed closer the expiration of the inventory item.

* * * * *